United States Patent
Breitenberger

[19]
[11] Patent Number: 6,155,228
[45] Date of Patent: Dec. 5, 2000

[54] MULTICYLINDER FOUR-STROKE INTERNAL COMBUSTION ENGINE

[75] Inventor: Manfred Breitenberger, Graz, Austria

[73] Assignee: Deutz AG, Cologne, Germany

[21] Appl. No.: 09/367,093

[22] PCT Filed: Apr. 8, 1998

[86] PCT No.: PCT/EP98/02033

§ 371 Date: Aug. 10, 1999

§ 102(e) Date: Aug. 10, 1999

[87] PCT Pub. No.: WO98/45591

PCT Pub. Date: Oct. 15, 1998

[30] Foreign Application Priority Data

Apr. 9, 1997 [AT] Austria ................................... A 608/97

[51] Int. Cl.[7] .................................................. F02B 31/00
[52] U.S. Cl. ........................... 123/308; 123/315; 123/432
[58] Field of Search ............................. 123/308, 188.14, 123/432, 315

[56] References Cited

U.S. PATENT DOCUMENTS

| | | | |
|---|---|---|---|
| 1,416,977 | 5/1922 | Roof | 123/75 |
| 3,331,359 | 7/1967 | Skatsche | 123/75 |
| 3,824,971 | 7/1974 | Skatsche et al. | 123/75 B |
| 4,369,627 | 1/1983 | Kasting | 60/605 |
| 4,643,136 | 2/1987 | Ura et al. | 123/52 M |
| 5,239,960 | 8/1993 | Sasaki et al. | 123/308 |
| 5,429,086 | 7/1995 | Glackin | 123/308 |

FOREIGN PATENT DOCUMENTS 86 05237 9/1986 WIPO.

*Primary Examiner*—Henry C. Yuen
*Assistant Examiner*—Mahmoud W Gimie
*Attorney, Agent, or Firm*—Charles L. Schwab; Hardaway/Mann IP Group Nexsen Pruet Jacobs & Pollard, LLP

[57] ABSTRACT

The invention relates to a multicylinder four-stroke internal combustion engine having a cylinder head (1) with an intake and an outlet port arrangement for two admission valves (15, 16, 17, 18) and two exhaust valves (26, 27) per cylinder. The admission valves (15, 16, 17, 18) are fitted on opposite-lying longitudinal sides of the engine and the exhaust valves (26, 27) on respective opposite side walls in relation to the crankshaft axis. One swirl duct (11, 12) and one filling duct (13, 14) leading to the admission valves (15, 16, 17, 18) are provided per cylinder (7, 8). In order to facilitate regulation of the distribution mechanism of the gas exchange valves, the exhaust ducts (29, 30) discharge directly into a flange surface (5) on a longitudinal side (6) of the engine; the intake ports (6) have sectional ducts (11, 12, 13, 14) and a main duct (10), whereby the main duct (10) discharges onto the longitudinal side of the internal combustion engine and the sectional ducts (11, 12, 13, 14) lead from the main duct (19) to the admission valves (15, 16, 17, 18) of adjoining cylinders (7, 8).

13 Claims, 4 Drawing Sheets

MULTICYLINDER FOUR-STROKE INTERNAL COMBUSTION ENGINE

TECHNICAL FIELD

This invention relates to a multiple cylinder four-stroke internal combustion engine that includes a cylinder head having intake ducts and exhaust ducts for two intake valves and two exhaust valves per cylinder, there being one swirl duct and one charge duct for each cylinder, and the exhaust ducts opening directly into a flange surface on one engine longitudinal side.

The internal combustion engine shown in U.S. Pat. No. 5,429,086 is provided with a crosscurrent cylinder head in which the exhaust ducts open on a first engine longitudinal side and the intake ducts open on the opposite engine longitudinal side. Insofar as possible, two intake ducts are led to intake valves of adjacent cylinders in each case. The first and last intake duct, as viewed in the engine longitudinal direction, are each lead as individual ducts to the engine longitudinal side. Overall, great manufacturing effort is required because of the resulting very different routing of the intake ducts along the internal combustion engine. What is more, the flow conditions to the individual intake valves differ because of the differently shaped intake ducts.

OBJECTS AND SUMMARY OF THE INVENTION

It is an object of the invention to avoid the before mentioned disadvantages and, in an internal combustion engine of the type cited, to use intake ducts which are as simple as possible to manufacture and optimal in terms of intake flow.

According to the invention, these objects are achieved by virtue of the fact that the intake valves on the one hand and the exhaust valves on the other hand are arranged each on opposite engine longitudinal sides, relative to the crankshaft axis, and that the intake ducts have four subducts and a main duct arranged geodetically thereover, the main duct opening on one engine longitudinal side and the subducts being led from the main duct as swirl ducts and charge ducts to the intake valves of adjacent cylinders. By virtue of this embodiment, the disadvantages described for the prior art are avoided. The main duct and the exhaust ducts can open into flange surfaces of opposite engine longitudinal sides. It is, however, more advantageous if the main duct and the exhaust ducts open into flange surfaces of one engine longitudinal side. In this embodiment the cylinder head is a cocurrent head in terms of design but a crosscurrent head in terms of function. The free space available on the opposite engine longitudinal side can be used, for example, for the mounting of accessories. The design free space gained in this way in the cylinder head can best be used in the case of simultaneously good intake flow behavior. The intake flow paths no longer need be uncovered for the performance of maintenance on the valve train, so that there is no danger of contamination or damage to the intake ducts during these operations. Preferably, the subducts are embedded in the cylinder head and the main duct is embedded substantially in a rocker arm housing mounted on they cylinder head.

The design of the intake ducts and their routing on the one hand in the rocker arm housing and on the other hand in the lower housing of the cylinder head complies with the casting requirements in manufacture.

What is more, it is advantageous for manufacture and assembly if the intake flange surface formed by the rocker arm housing and the exhaust flange surface formed by the lower housing of the cylinder head are made roughly parallel to the engine longitudinal plane.

Preferably, the intake flange surface lies above and the exhaust flange surface lies below the parting plane between the lower housing and the rocker arm housing of the cylinder head. The injection nozzle preferably lies in the middle of the cylinder.

An intake duct shape that is favorable in terms of flow and economical in terms of space can further be achieved by virtue of the fact that the subducts to the valves of a first cylinder and the subducts to the valves of a second cylinder are made symmetrical relative to one another and that the main duct is arranged substantially transversely to the openings of the subducts and transversely to the engine longitudinal axis in the region between two cylinders.

Preferably, the main intake ducts are made roughly normal to the engine longitudinal plane. The main intake ducts in the rocker arm housing run substantially transversely to the engine longitudinal plane; the subducts in the lower housing of the cylinder head, in contrast, run substantially in the direction of the valve axes.

In an especially preferable embodiment of the invention, the subducts issue from a plenum of the main intake duct arranged in the region of the parting plane between the cylinder head lower housing and the rocker arm housing.

The rocker arm housing is preferably made as a diecasting.

BRIEF DESCRIPTION OF THE DRAWINGS

One embodiment of the invention is illustrated in the drawings, in which.

DETAILED DESCRIPTION OF THE INVENTION

Figure 1:
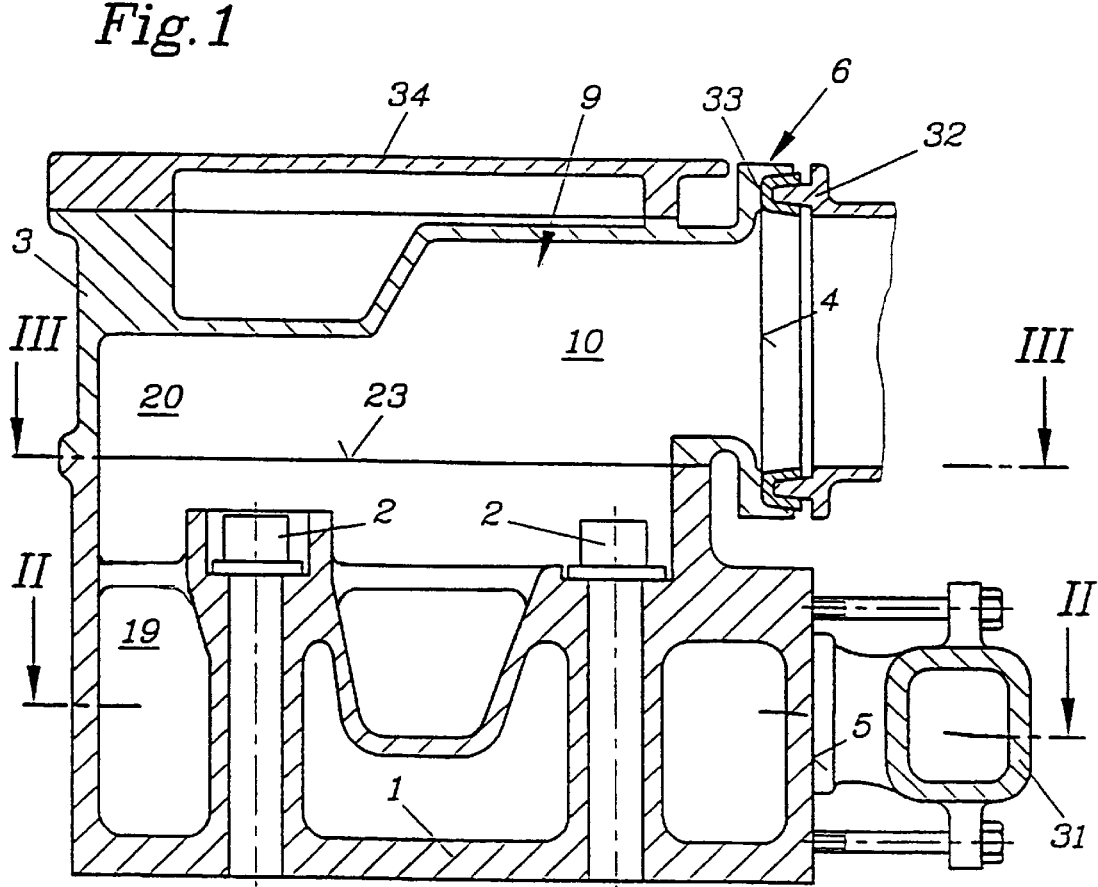
FIG. 1 shows a cylinder head with rocker arm housing according to the invention, in cross section taken along the line I—I in FIG. 2.

The cylinder head 1, which is attached by cylinder-head bolts 2 to the cylinder block, not shown, includes a lower housing and a rocker arm housing 3 designed in such a way that the intake flange surface 4 and the exhaust flange surface 5 are located on the same engine longitudinal side 6. For every two adjacent cylinders 7, 8, each intake duct 9 consists of a main duct 10 partly formed by the lower housing and partly formed by the rocker arm housing 3 and four subducts 11, 12, 13, 14, each leading to an intake valve 15, 16, 17, 18 of the two cylinders 7, 8. Subducts 11, 12 are swirl ducts for cylinders 7 and 8, respectively, and subducts 13, 14 are charge ducts for cylinders 7 and 8, respectively.

The charge ducts 13, 14 issue form a common cross-sectional regional region 19 of a plenum 20 formed by the main duct 10. The intake ducts 9 of every two adjacent cylinders 7, 8 are arranged symmetrically relative to a plane 22 normal to the crankshaft axis 24 between the two cylinders 7, 8.

The plenum 20 and the main duct 10 components of the intake duct 9 are located in the parting plane 23 between the rocker arm housing 3 and the lower housing of the cylinder head 1. This configuration makes it possible to manufacture the rocker arm housing 3 as a die-casting.

The valve axes 15a, 16a, 17a, 18a of the intake valves 15, 16, 17, 18 lie in a longitudinal plane 25a that is parallel to the engine longitudinal plane 25 defined by the crankshaft axis 24 and the cylinder axes 7a and 8a. The axes 26a, 27a of the exhaust valves 26, 27 are also arranged in a longitudinal plane 25b parallel to the engine longitudinal plane 25. The exhaust ducts 29, 30 are each designed as short as possible between the exhaust valves 26, 27 and the exhaust flange surface 5. The reference number 28 identifies the nozzle holder of a centrally arranged injection nozzle.

The exhaust manifold 31 is adjacent to the exhaust flange surface 5. The intake plenum 32 is attached to the intake flange surface 4 of the rocker arm housing 3. The reference number 33 identifies a seal between the intake plenum 32 and the rocker arm housing 3.

The rocker arm cover 34 is removably mounted on the top of the rocker arm housing 3. The rocker arm cover 34 can be removed in order to perform maintenance and adjustment operations on the valve train of the intake valves 15, 16, 17, 18 and the exhaust valves 26, 27.

Figure 2:
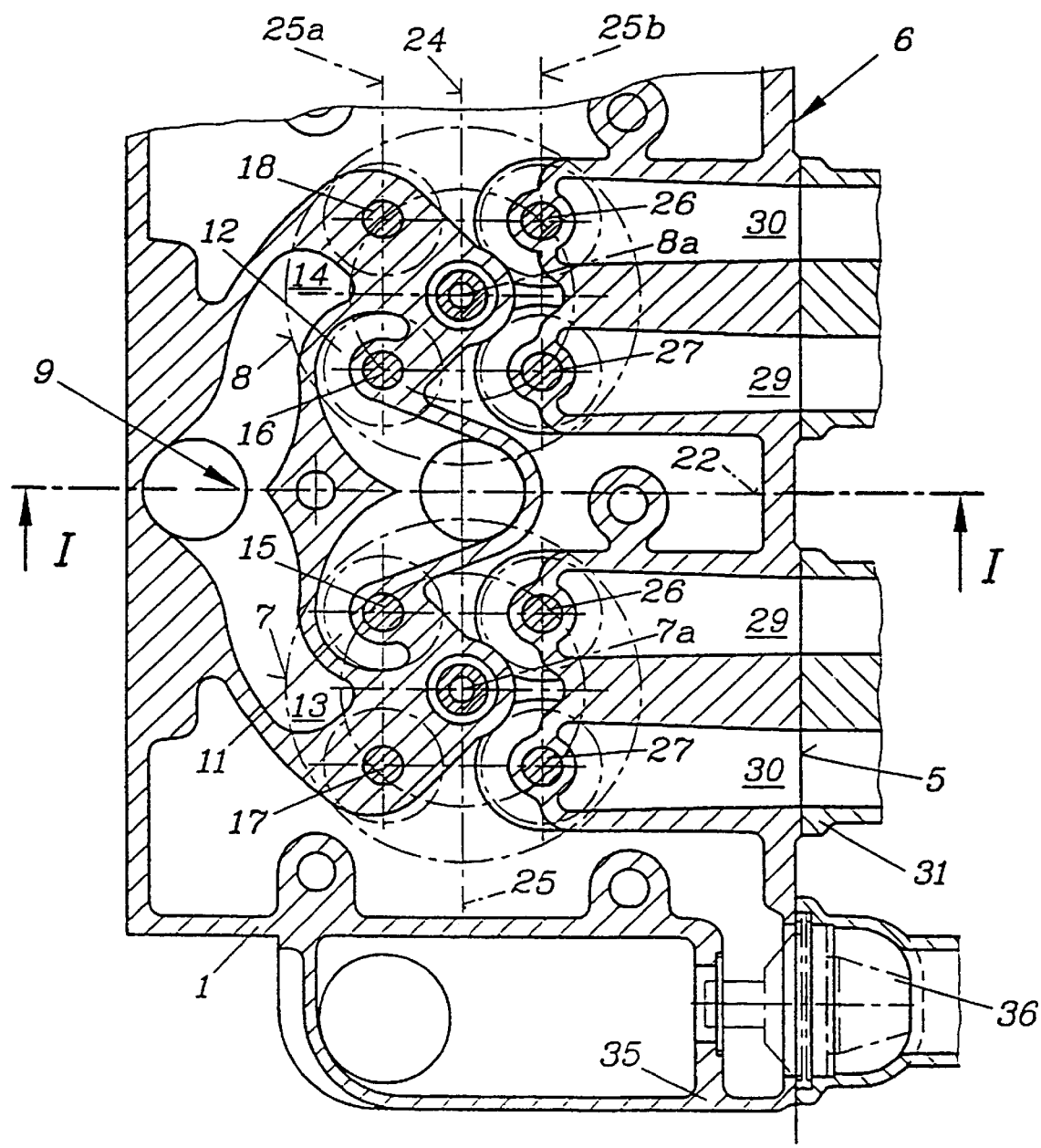
FIG. 2 is a longitudinal section through the cylinder head along the line II—II in FIG. 1.
Figure 3:
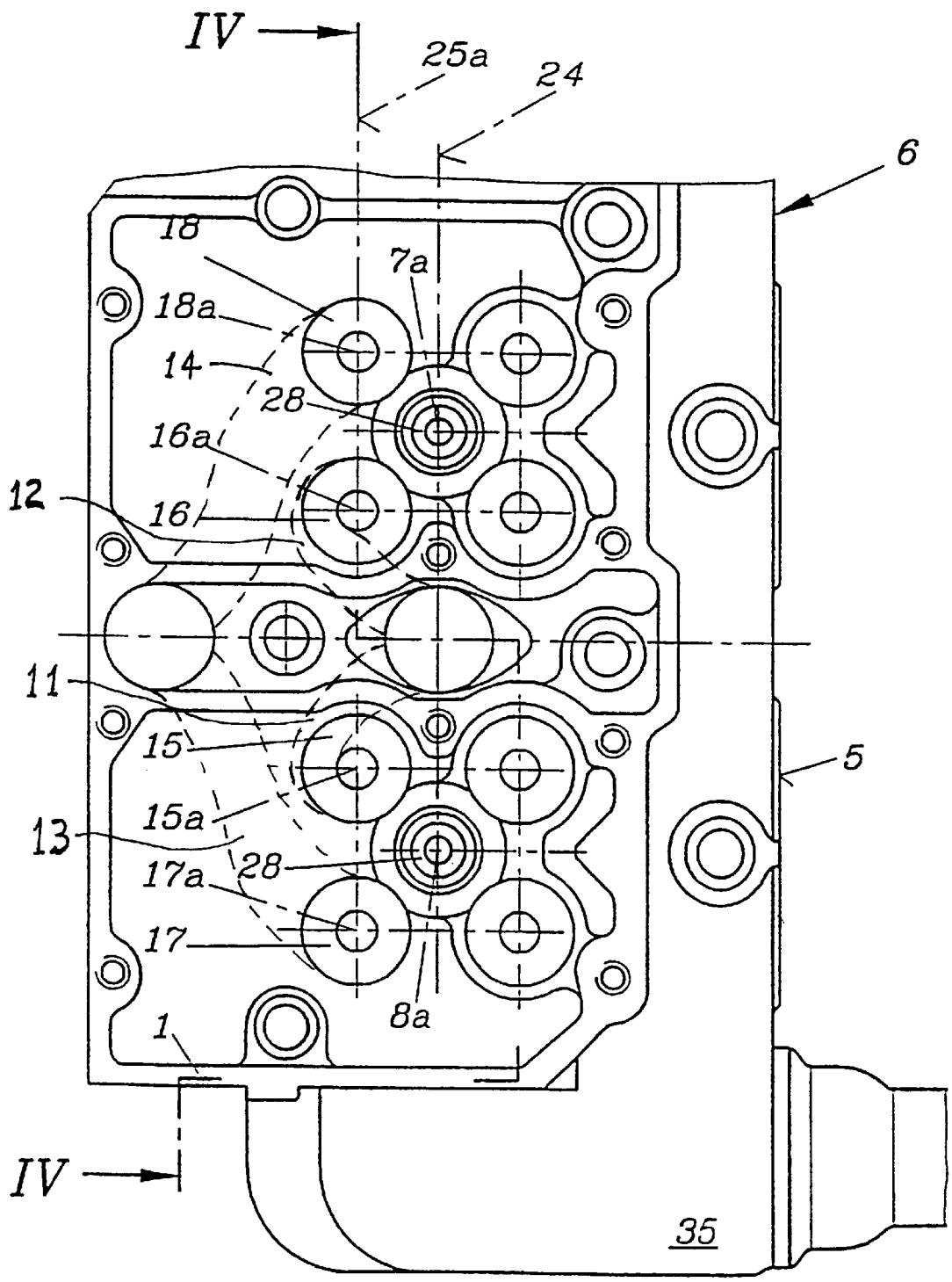
FIG. 3 is a top view of the cylinder head taken along the line III—III in FIG. 1.
Figure 4:
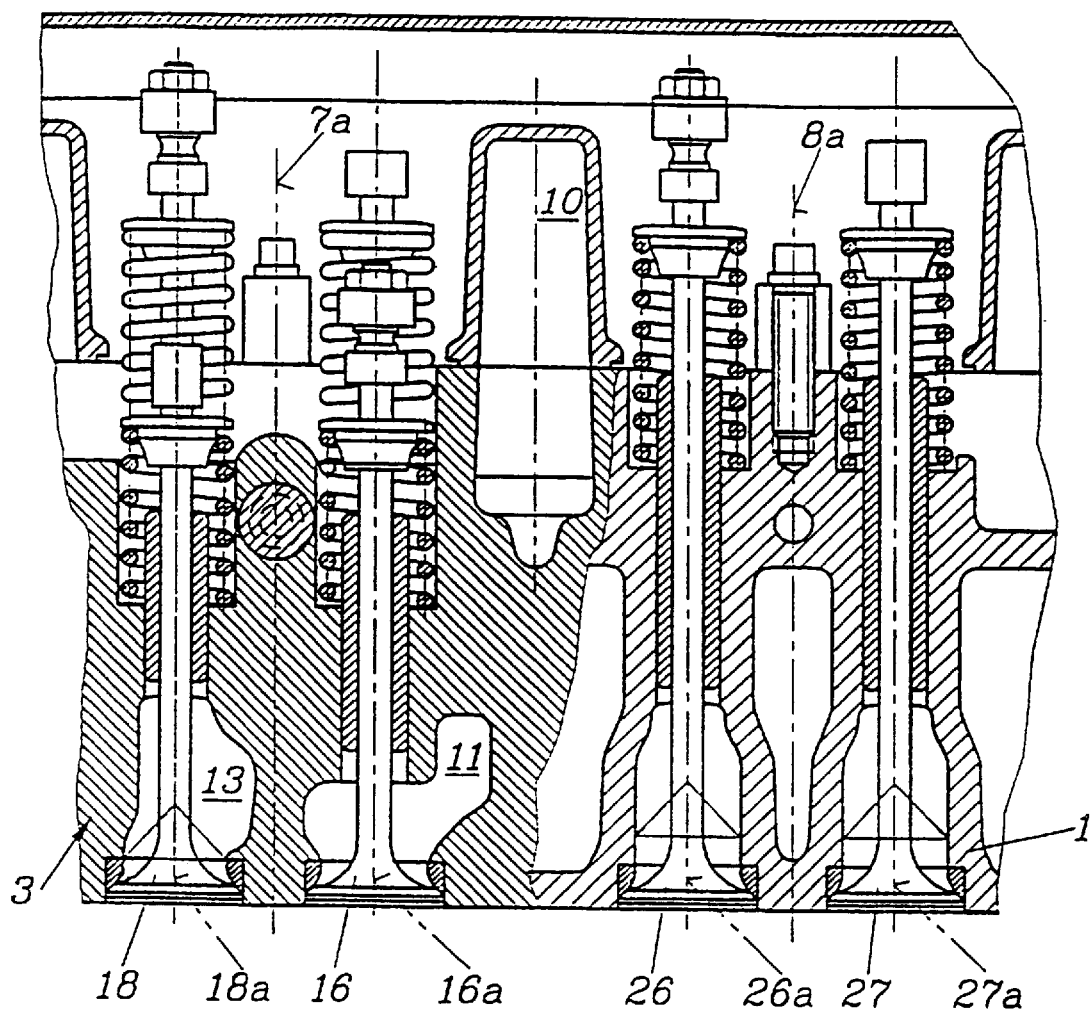
FIG. 4 is a section taken along the line IV—IV in FIG. 3.

The reference number 35 in FIGS. 2 and 3 identifies a thermostat housing, mounted on the end of the cylinder head 1, for a coolant thermostat 36.

What is claimed is:

1. In a four-stroke internal combustion engine having a cylinder block including at least two parallel, in-line cylinders, the combination comprising;

a cylinder head (1) including two intake valves per cylinder and two exhaust valves (26, 27) per cylinder, said intake valves and said exhaust valves, respectively, lying on opposite longitudinal sides of said engine relative to the crankshaft axis of said engine, an intake duct (9) including a main duct (10) branching into a pair of swirl ducts (11, 12) and branching into a pair of charge ducts (13, 14), a first of said swirl ducts and a first of said charge ducts leading to said intake valves, respectively, of one of said cylinders and a second of said swirl ducts and a second of said charge ducts leading to said intake valves, respectively, of the other of said cylinders and exhaust ducts (29, 30) connected to said exhaust valves (26,27) and opening directly into a flange surface (5) on said cylinder head (1) at one engine longitudinal side (6), said one engine longitudinal side (6) being the longitudinal side of said engine closest to said exhaust valves (26, 27), said main duct (10) being geodetically disposed above said swirl and charge ducts and said main duct (10) opening on one of said opposite longitudinal sides of said engine, said swirl ducts (11, 12) and said charge ducts (13, 14) lying on the engine longitudinal side opposite said engine longitudinal side (6) closest to said exhaust valves (26, 27).

2. The internal combustion engine of claims 1 wherein said main duct (10) and said exhaust ducts open into flange surfaces (4, 5) on the same engine longitudinal side (6).

3. The internal combustion engine of claim 1 wherein said main duct (10) and said exhaust ducts open into flange surfaces on opposite engine longitudinal sides.

4. The internal combustion engine of claim 1 wherein said cylinder head (1) includes a lower housing and a rocker arm housing (3), said swirl and charge ducts (11, 12, 13, 14) are formed in said lower housing and said main duct (10) is substantially formed in said rocker arm housing (3).

5. The internal combustion engine of claim 1 wherein the swirl and charge ducts leading to the intake valves (15, 17) of one of said cylinders and the swirl and charge ducts leading to the valves (16, 18) of the other of said cylinders are symmetrical relative to one another and wherein said main duct (10) is disposed substantially transverse to the openings of said swirl and charge ducts (11, 12, 13, 14) and is disposed transverse to the engine longitudinal axis in the region between said two cylinders (7, 8).

6. The internal combustion engine of claim 1 and further comprising an injection nozzle (28) in said cylinder head for each cylinder in substantially coaxial relation to the associated cylinder.

7. The internal combustion engine of claim 1 wherein said cylinder head (1) includes a rocker arm housing (3) presenting an intake flange surface (4) and a lower housing presenting an exhaust flange surface (5), said intake flange surface (4) and said exhaust flange surface (5) being substantially parallel to the longitudinal plane (25) of said engine.

8. The internal combustion engine of claim 1 wherein said main duct (10) is substantially normal to the longitudinal plane (25) of said engine.

9. The internal combustion engine of claim 1 wherein said cylinder head (1) includes a lower housing and a rocker arm housing (3) and wherein said main duct (10) includes a plenum (20) in the region of the parting plane (23) between said lower housing and said rocker arm housing (3), said swirl and charge ducts extending from said plenum (20).

10. The internal combustion engine of claim 1 wherein said cylinder head (1) includes a lower housing and a rocker arm housing (3) and wherein said rocker arm housing (3) is a die casting which includes a substantial part of said main duct (10).

11. The internal combustion engine of claim 1 wherein said cylinder head (1) includes a lower housing and a rocker arm housing (3) and wherein said main duct (10) opens on said rocker arm housing (3).

12. The internal combustion engine of claim 11 wherein said main duct (10) and said exhaust ducts (29, 30) open on the longitudinal side of said engine closest to said exhaust valves (26, 27).

13. The internal combustion engine of claim 1 and further comprising a pair of cylinder head bolts (2) disposed between said cylinders and fastening said cylinder head (1) to said cylinder block, said main duct (10) lying above said cylinder head bolts (2).

* * * * *